United States Patent [19]
Müller

[11] Patent Number: 6,039,100
[45] Date of Patent: Mar. 21, 2000

[54] STAY MEMBER FOR TIRE CHAINS, ESPECIALLY FOR PROTECTIVE TIRE CHAINS

[75] Inventor: Anton Müller, Aalen, Germany

[73] Assignee: Eisen - und Drahtwerk Erlau Aktiengesellschaft, Germany

[21] Appl. No.: 09/005,314

[22] Filed: Jan. 9, 1998

[51] Int. Cl.⁷ .................................................. B60C 11/00
[52] U.S. Cl. .......................... 152/243; 152/242; 152/245; 152/171
[58] Field of Search ...................... 152/171, 172, 152/243, 231, 225, 233, 241, 242, 244, 245, 222, 223

[56] References Cited

U.S. PATENT DOCUMENTS

| | | | |
|---|---|---|---|
| 3,595,293 | 7/1971 | Muller | 152/243 |
| 3,709,275 | 1/1973 | Muller | 152/243 |
| 3,714,975 | 2/1973 | Muller | 152/243 |
| 3,799,232 | 3/1974 | Schnurle | 152/243 |
| 3,870,094 | 3/1975 | Schurle et al. | 152/243 |
| 3,892,268 | 7/1975 | Asbeck | 152/243 |
| 4,928,740 | 5/1990 | Konig | 152/243 |
| 4,947,912 | 8/1990 | Weidler | 152/243 |
| 5,058,645 | 10/1991 | Muller | 152/244 |
| 5,072,763 | 12/1991 | Muller | 152/243 |

*Primary Examiner*—S. Joseph Morano
*Assistant Examiner*—Long Bae Nguyen
*Attorney, Agent, or Firm*—Robert W. Becker & Associates

[57] ABSTRACT

The stay member for a tire chain has a base member including a base portion and a wear portion. The base member has a longitudinal center plane. The base member has at least one connecting opening for receiving connecting members of the tire chain. The base portion includes a tire contact surface opposite the wear portion. The wear portion projects at least partly laterally past the base portion and has a wear surface and lateral surfaces. The wear surface includes grooves extending perpendicularly to the longitudinal center plane. The lateral surfaces extend at such an angle to one another that ring members received in neighboring ones of the stay members are spaced from one another when the stay members touch one another.

21 Claims, 4 Drawing Sheets

STAY MEMBER FOR TIRE CHAINS, ESPECIALLY FOR PROTECTIVE TIRE CHAINS

BACKGROUND OF THE INVENTION

The present invention relates to a stay member for tire chains, especially protective tire chains, comprising a base member which includes a base portion with a tire contact surface and at least one connecting opening for receiving preferably annular connecting members, and further comprising a wear portion having a wear surface and lateral surfaces and projecting at least partly past the base portion. The wear portion has depressions in the lateral surfaces and/or in the wear surface.

In a known stay member of this kind (European patent application 03 02 815) the wear portion which is wider than the base portion is provided at its lateral sides with depressions arranged in series one after another and opening into the wear surface. The wear surface itself has at half its width circular depressions arranged spaced to one another. The lateral sides of the wear portion extend parallel to one another and to the longitudinal center plane of the stay member. This results in the risk that, when assembled in a tire chain, at respective pulling loads of the tire chain the stay members can rest or come into contact with one another such that the annular members connected therein will come in touch with one another or overlap. When driving on the tire chain, the annular members can be damaged or can break. Furthermore, the stay member has the disadvantage that the depressions within the wear surface reduce the stability of the wear portion and with increasing wear there is the risk that the wear portion will break.

It is therefore an object of the present invention to embody a stay member of this kind such that a long service life of the tire chain comprising of the stay members is ensured.

SUMMARY OF THE INVENTION

The stay member for a tire chain according to the present invention is primarily characterized by:
- a base member comprised of a base portion and a wear portion;
- the base member having a longitudinal center plane;
- the base member having at least one connecting opening for receiving connecting members of the tire chain;
- the base portion comprising a tire contact surface opposite the wear portion;
- the wear portion projecting at least partly laterally past the base portion and comprising a wear surface and lateral surfaces;
- the wear surface comprising grooves extending perpendicularly to the longitudinal center plane;
- the lateral surfaces extending in such an angle to one another that ring members received in neighboring ones of the stay members are spaced from one another when the stay members touch one another.

Advantageously, the grooves extend over the entire width of the wear surface.

The lateral surfaces have depressions and the grooves of the wear surface open into the depressions.

Expediently, the depressions extend over the entire height of the wear portion.

Each one of the lateral surfaces preferably has two of the depressions.

The depressions provided on a respective one of the lateral surfaces extend parallel to one another.

The wear portion is expediently diamond-shaped.

The depressions within the lateral surfaces arranged at an obtuse angle to one another on the same side of the longitudinal center plane extend in opposite directions. Preferably, the depressions extending in opposite directions are arranged in a V-shape to one another.

The base member has a transverse center plane extending perpendicularly to the longitudinal center plane. The base member is preferably symmetrical to the longitudinal center plane and/or the transverse center plane.

Advantageously, the lateral surfaces abutting one another and positioned on a same side of the longitudinal center plane are arranged at an obtuse angle to one another. The obtuse angle is preferably approximately 135°.

The lateral surfaces abutting one another and positioned on opposite sides of the longitudinal center plane are arranged at an acute angle to one another which is preferably approximately 40°.

Preferably, the lateral surfaces have a rounded transition into one another.

The base member preferably has rounded end faces and/or rounded corners.

The grooves have preferably inwardly slanted edges or arc-shaped edges.

Preferably, the depressions also have inwardly slanted edges or arc-shaped edges.

The at least one connecting opening has an inner surface at the base portion and an inner surface at the wear portion, wherein the inner surfaces of the base portion and of the wear portion face one another. Each one of the inner surfaces comprises two surface portions positioned at an obtuse angle to one another.

With the inventive embodiment the wear portion of the stay member is embodied such that the annular connecting members of the tire chain received in the connecting openings of the stay member will not come into contact with one another even when the tire chain is worn or the tire chain assembly has become loose. The annular connecting members are thus protected against damage and breakage. The angularly arranged lateral surfaces of the wear portion have the advantage that the wear surface is relatively large and thus provides a large wear volume. The depressions or grooves provided within the wear surface result in great grip without compromising the stiffness or stability of the stay member so that even with increasing wear the risk of breakage or breaking away of portions of the wear portion is reliably reduced or eliminated.

BRIEF DESCRIPTION OF THE DRAWINGS

The object and advantages of the present invention will appear more clearly from the following specification in conjunction with accompanying drawings, in which.

DESCRIPTION OF PREFERRED EMBODIMENTS

The present invention will now be described in detail with the aid of several specific embodiments utilizing FIGS. 1 through 8.

Figure 4:
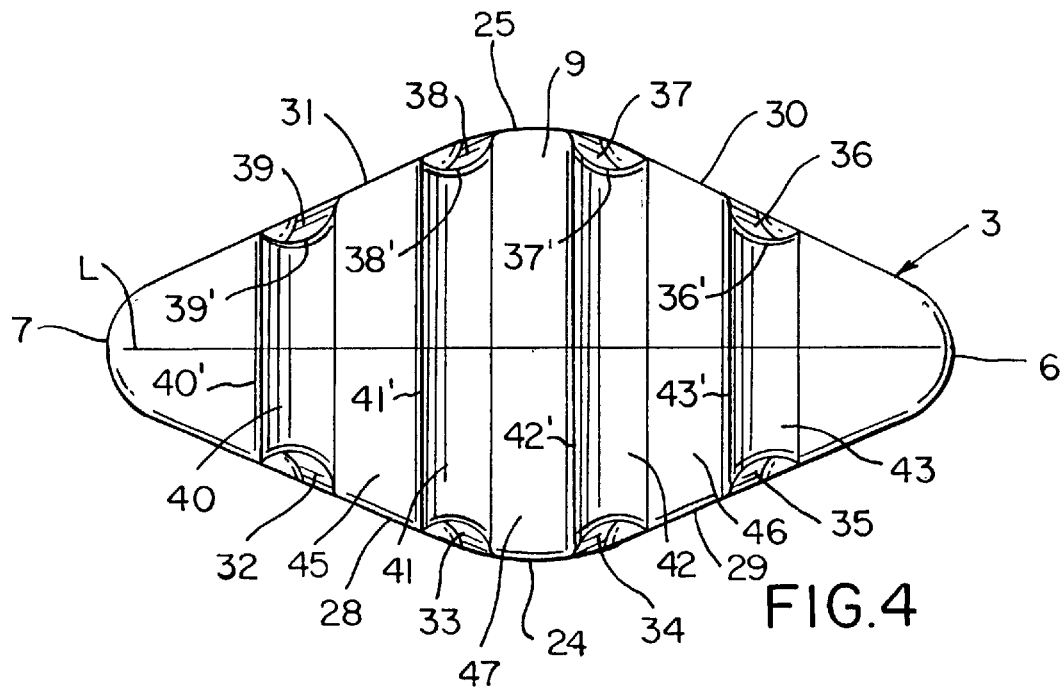
FIG. 4 shows the stay member according to FIG. 1 in a plan view according to arrow IV in FIG. 1.
Figure 5:
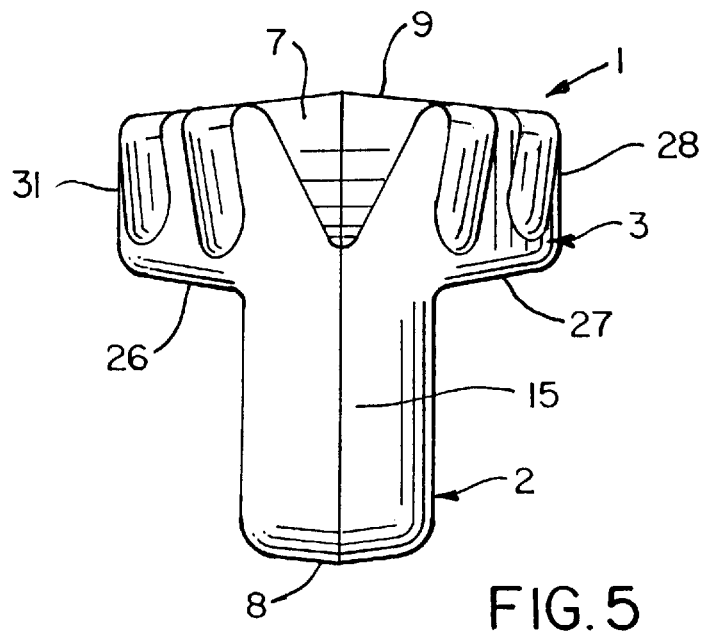
FIG. 5 shows the stay member according to FIG. 1 in an end view according to arrow V of FIG. 1.
Figure 6:
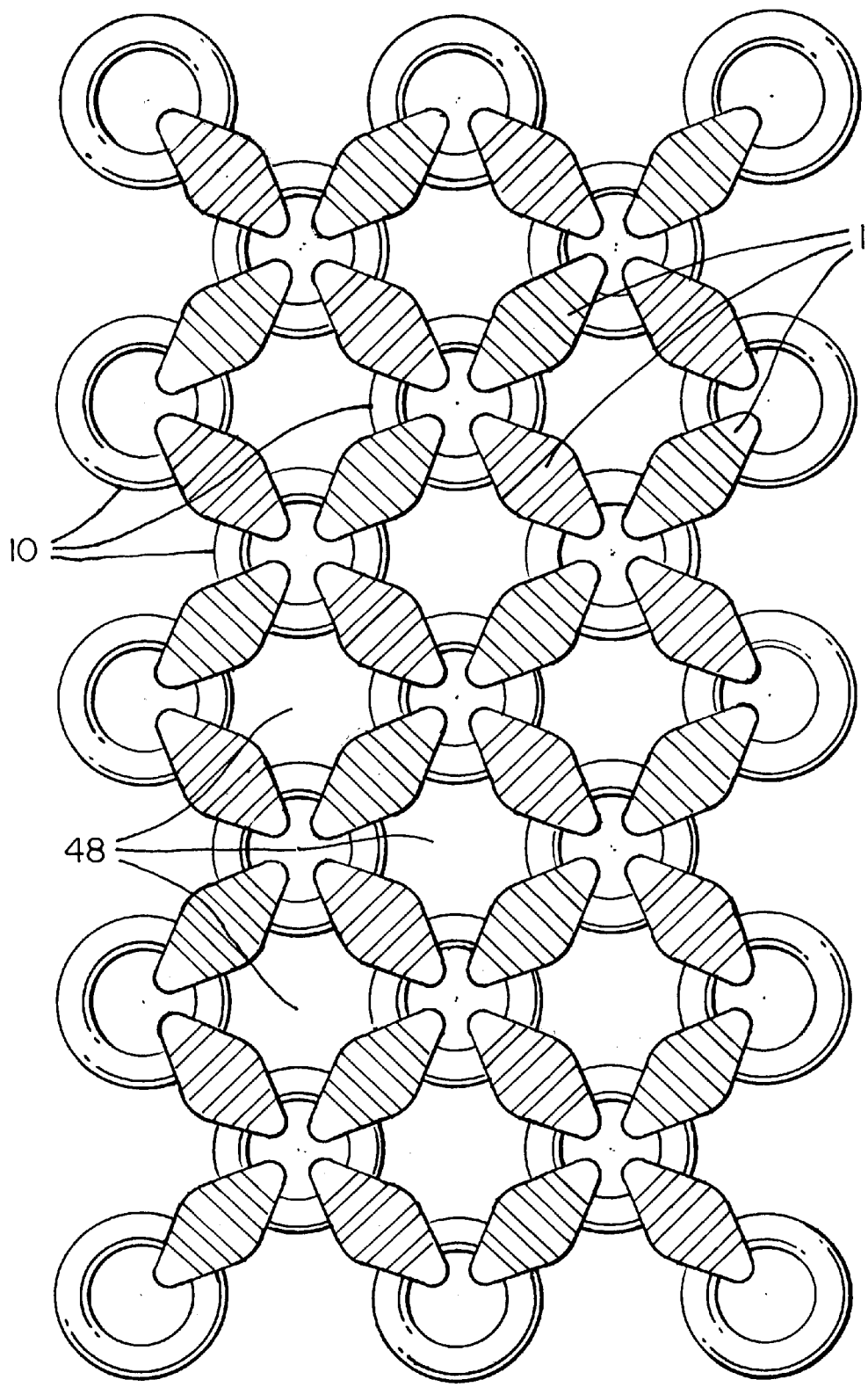
FIG. 6 is a plan view of a portion of the protective tire chain with inventive stay members according to FIGS. 1 through 5 connected by annular connecting members.
Figure 7:
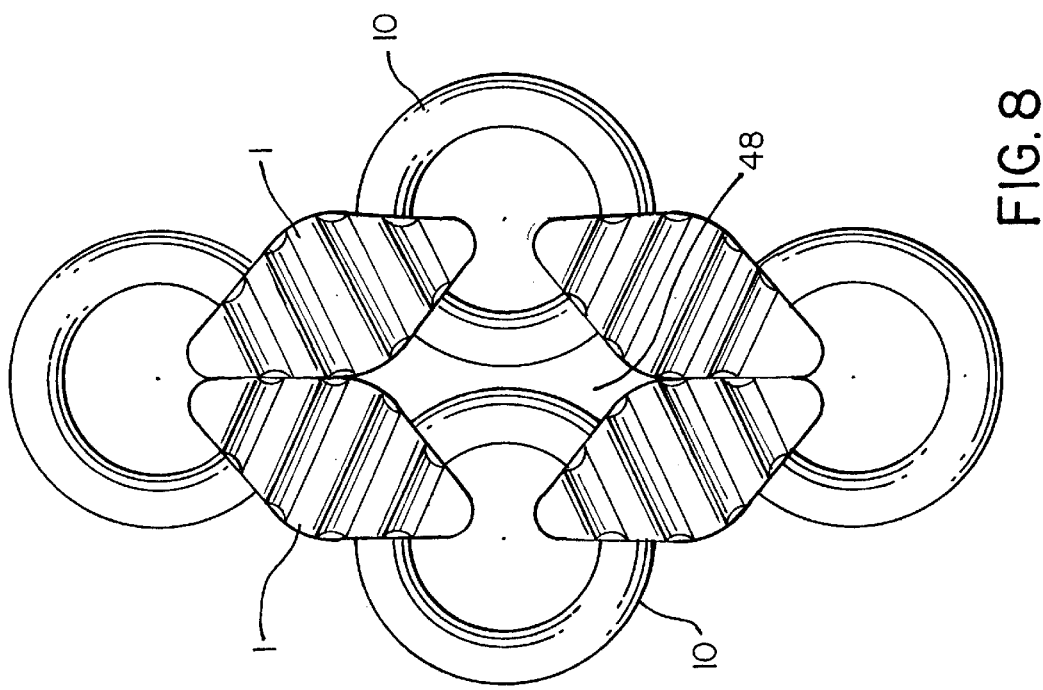
FIG. 7 is a detail of the tire chain according to FIG. 6 in an enlarged representation.
Figure 8:
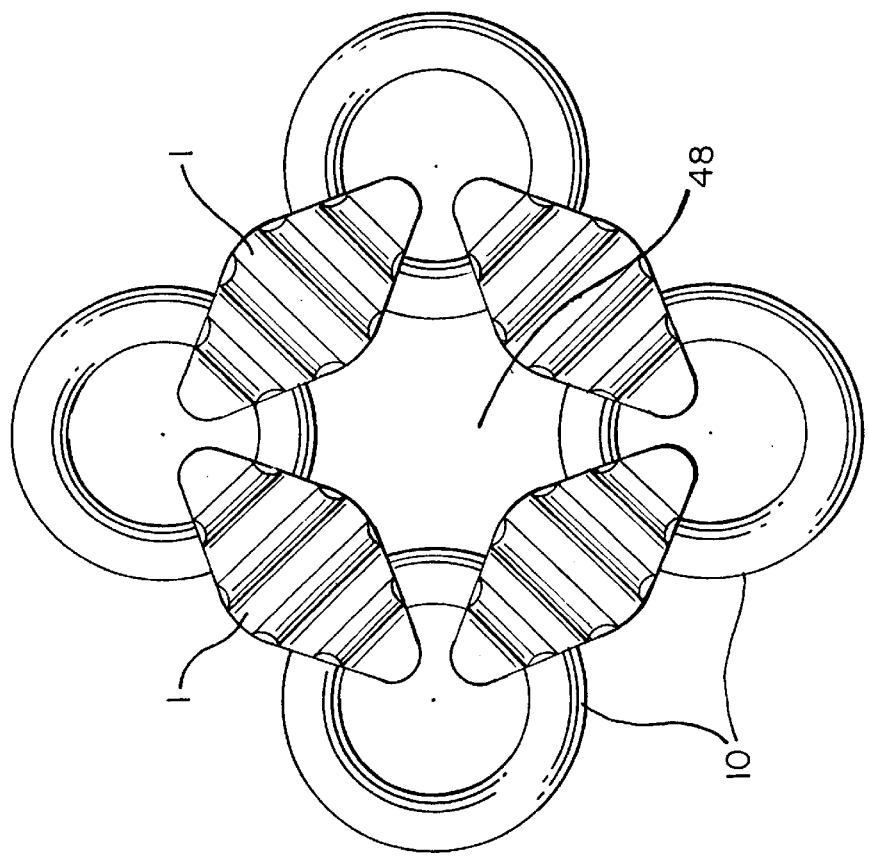
FIG. 8 shows the detail according to FIG. 7 whereby the tire chain is kept loose for driving.

The stay member 1 represented in FIGS. 1 through 5 is preferably used together with identical stay (vertical) members and horizontally positioned annular connecting members 10 in an assembly of a tire chain, preferably a protective tire chain (FIG. 6 through 8).

Figure 1:
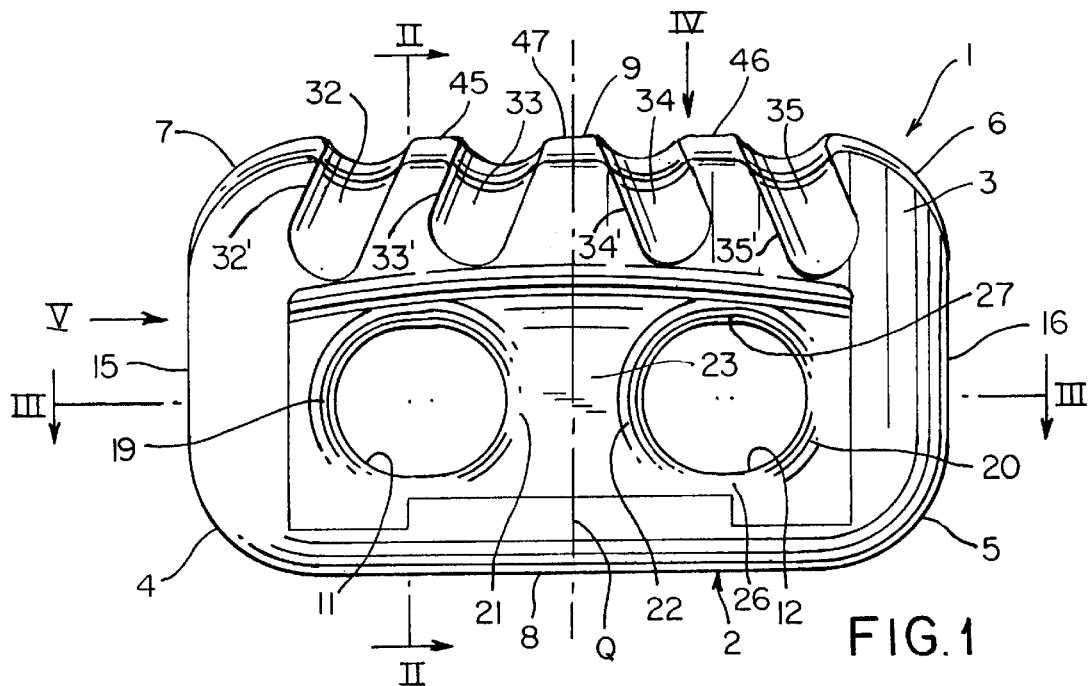
FIG. 1 is the inventive stay member in a side view.
Figure 2:
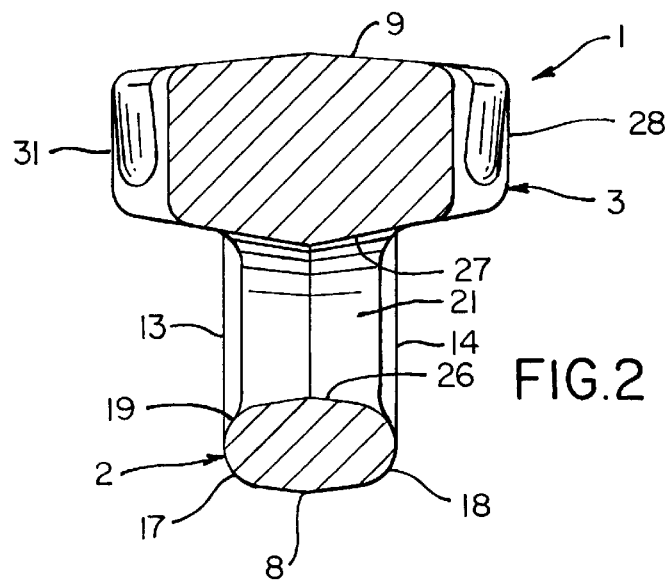
FIG. 2 is a section along the line II—II of FIG. 1.

The stay member 1 has a substantially plate-shaped base member which, in the side view according to FIG. 1, has a substantially rectangular contour with rounded corners 4 through 7. The base member is comprised of a base portion 2 with a tire contact surface 8 and a wear portion 3 with a wear surface 9. The base portion 2 is thinner than the wear portion 3 and comprises to connecting openings 11 and 12 spaced in the longitudinal direction at a distance from one another and preferably embodied as slotted holes. In these connecting openings 11 and 12 the annular connecting members 10 (FIGS. 6 through 8) are received for forming the tire chain. The base portion 2 extends approximately over two thirds of the height of the stay member 1, and in the end view according to FIG. 5, has a substantially longitudinal rectangular contour. The wear portion 3 projects past both longitudinal sides 13 and 14 of the base portion 2 and has a diamond shape, when viewed from the end (FIGS. 2 and 5).

The end faces 15 and 16 of the stay member 1 are rounded at the corners 4 through 7 in a arc-shape. The tire contact surface 8, with which the stay member 1 rests at the tires when the tire chain is mounted, is spherically embodied and has a transition at the level of the connecting openings 11, 12 via rounded lateral edges 17 and 18 into the part-circularly curved edge portions 19 and 20 of the connecting openings 11, 12 which are slanted inwardly in the direction toward the longitudinal center plane L. The rounded embodiment of the tire contact surface 8 ensures an optimal tire protection. The lateral edges 21 and 22 of the intermediate stay 23 (FIG. 1) provided between the connecting opening 11 and 12 and the inner surfaces 26, 27 of the connecting openings 11, 12 at the base portion 2 and the wear portion 3 facing one another are substantially roof-shaped (FIG. 2), i.e., are comprised of two surface portions positioned at an obtuse angle to one another.

Figure 3:
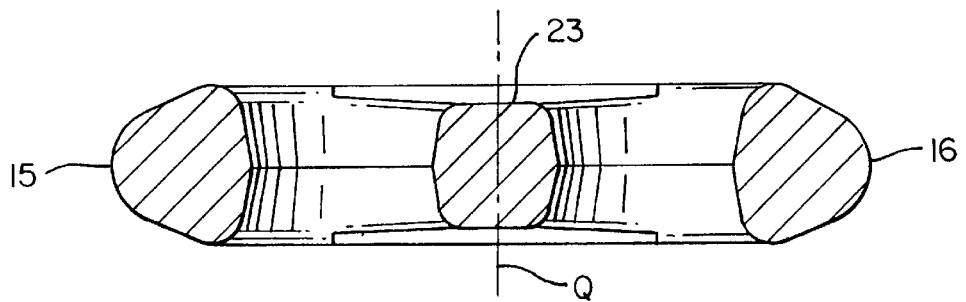
FIG. 3 is a section along the line III—III of FIG. 1.

The wear surface 9 in a plan view according to FIG. 4 has a diamond shape with rounded corners 7, 6, 24, 25. At half its length the wear portion 3 has its greatest width which is approximately identical to half the length of the stay member 1. The corners 7, 6 of the wear surface 9 have a transition into the end faces 15, 16 of the stay member and are rounded with smaller radius than the corners 24 and 25. The lateral surfaces 28 through 31 of the wear portion 3 have substantially the same length. The lateral surfaces 28, 31; 29, 30 adjacent to the end faces 15 and 16 are positioned at an acute angle to another, preferably an angle of approximately 40°. The lateral surfaces 28, 29 and 30, 31 connected at the corners 24, 25 have an obtuse angle of approximately 135° to one another. The end faces 15, 16 in cross-section according to FIG. 3 are covexly curved.

The lateral surfaces 28 through 31 have preferably two depressions 32 to 39 extending over the entire height of the wear portion 3. With respect to the transverse center plane Q of the stay member, these depressions extend at an identical acute angle of approximately 25°. The depressions 32, 33 and 38, 39 of the lateral surfaces 28 and 31 are slanted in a direction toward the remote end face 16 while the depressions 34 to 37 of the lateral surfaces 29 and 30 are slanted in the opposite direction. All depressions 32 to 39 are embodied as grooves that open into the wear surface 9.

The wear portion 3 comprises additional depressions in the form of grooves extending transversely within the wear surface 9. The transverse grooves 40 to 43 extend preferably perpendicularly to the longitudinal center plane L of the stay member and extend parallel and at the same spacing to one another. The transverse grooves 40 to 43 connect the oppositely arranged lateral depressions 32, 39; 33, 38; 34, 37; 35, 36. Because of the transverse grooves 40 to 43 the wear surface 9 is profiled approximately wave-shaped when viewed in the longitudinal direction of the stay member. The depressions 32 to 39 and the transverse grooves 40 to 43 are arranged such the at half the width of the wear portion 3, respectively, the wear surface 9 a central projection 47 between the transverse grooves 41 and 42 is provided. Between these grooves 41, 42 and the outwardly positioned transverse grooves 40, 43 respective further projections 45 and 46 are provided. The transverse grooves 40 and 43 are positioned in close proximity to the corners 7 and 6. The depressions 32 to 39 and transverse grooves 40 to 43 have inwardly slanted, preferably part-circularly slanted (arc-shaped) edges 32' to 39' and 40' to 43'. In cross-section, the depressions and transverse grooves 32–39, 40–43 are part-circular.

The slantedly extending lateral depressions 32 to 39 as well as the transverse grooves 40 to 43 extending transversely within the wear surface 9 ensure great grip and stability as well as high lateral stability of the stay member 1. Furthermore, with the depressions and transverse grooves the hardened surface of the stay member is considerably increased so that the stay member as well as a tire chain made of these stay members has a long service life.

The diamond-shaped cross-sectional embodiment of the wear potion 3 disclosed above as well as the diamond-shaped wear surface 9 ensures that when arranging the stay members 1 within a tire chain, as represented in an exemplary manner in FIGS. 6 through 8, the annular connecting members 10 cannot come into contact with one another. This prevents damage or destruction of the annular connecting members. Even when the individual mesh openings 48 in the longitudinal direction of the chain, or transverse thereto, are expanded, the disclosed embodiment will result only in contacting of the stay members 1. This is very advantageous because respective protective tire chains, in general, are maintained and serviced poorly so that only after a very short service life they have relatively great play and the annular connecting members 10 could come into contact with one another, whereby contacting and overlapping could result in damage or breakage. Especially when the tire chain is used in the mining industry in underground operations where the chains are continuously used and usually serviced on an insufficient maintenance schedule, there is the risk that the tire chain or protective tire chains are driven in a loose assembly so that the stay members 1, as shown in FIG. 8, will come into contact with one another. For a stretched chain mesh opening 48, adjacently positioned stay members 1 will contact neighboring lateral surface or edges at their wear portions 3. In this case, as clearly shown in FIG. 8, adjacently positioned annular connecting members 10 still have a spacing therebetween so that contacting or overlapping of the annular connecting members 10 can be safely prevented.

The specification incorporates by reference the disclosure of German priority document 297 00 410.7 of Jan. 11, 1997.

The present invention is, of course, in no way restricted to the specific disclosure of the specification and drawings, but also encompasses any modifications within the scope of the appended claims.

What is claimed is:

1. A stay member for a tire chain, said stay member comprising:

a base member comprised of a base portion and a wear portion;

said base member having a longitudinal center plane;

said base member having at least one connecting opening for receiving connecting members of the tire chain;

said base portion comprising a tire contact surface opposite said wear portion;

said wear portion projecting laterally past said base portion;

said wear portion comprising a wear surface and lateral surfaces;

said wear surface comprising grooves extending perpendicularly to said longitudinal center plane;

said wear portion being diamond-shaped in plan view so that said lateral surfaces are positioned at an angle to one another such that ring members, received in neighboring ones of said stay members, are spaced from one another and protected from being damaged when said lateral surfaces of neighboring ones of said stay members touch one another.

2. A stay member according to claim 1, wherein said grooves extend over the entire width of said wear surface.

3. A stay member according to claim 1, wherein said lateral surfaces have depressions and wherein said grooves of said wear surface open into said depressions.

4. A stay member according to claim 3, wherein said depressions extend over the entire height of said wear portion.

5. A stay member according to claim 3, wherein each one of said lateral surfaces has two of said depressions.

6. A stay member according to claim 3, wherein said depressions on a respective one of said lateral surfaces extend parallel to one another.

7. A stay member according to claim 1, wherein said depressions within said lateral surfaces arranged at an obtuse angle to one another on the same side of said longitudinal center plane extend in opposite directions.

8. A stay member according to claim 7 wherein said depressions extending in opposite directions are arranged in a V-shape to one another.

9. A stay member according to claim 1, wherein said base member has a transverse center plane extending perpendicularly to said longitudinal center plane, wherein said base member is symmetrical to said longitudinal center plane.

10. A stay member according to claim 9, wherein said base member is symmetrical to said transverse center plane.

11. A stay member according to claim 1, wherein said base member has a transverse center plane extending perpendicularly to said longitudinal center plane, wherein said base member is symmetrical to said transverse center plane.

12. A stay member according to claim 1, wherein said lateral surfaces abutting one another and positioned on a same side of said longitudinal center plane are arranged at an obtuse angle to one another.

13. A stay member according to claim 12, wherein said obtuse angle is 135°.

14. A stay member according to claim 1, wherein said lateral surfaces abutting one another and positioned on opposite sides of said longitudinal center plane are arranged at an acute angle to one another.

15. A stay member according to claim 14, wherein said acute angle is 40°.

16. A stay member according to claim 1, wherein said lateral surfaces have a rounded transition into one another.

17. A stay member according to claim 1, wherein said base member has rounded end faces.

18. A stay member according to claim 1, wherein said base member has rounded corners.

19. A stay member according to claim 3, wherein said grooves have inwardly slanted edges or arc-shaped edges.

20. A stay member according to claim 3, wherein said depressions have inwardly slanted edges or arc-shaped edges.

21. A stay member according to claim 1, wherein said at least one connecting opening has an inner surface at said base portion and an inner surface at said wear portion, wherein said inner surfaces of said base portion and of said wear portion face one another, and wherein each one of said inner surfaces comprises two surface portions positioned at an obtuse angle to one another.

* * * * *

UNITED STATES PATENT AND TRADEMARK OFFICE
CERTIFICATE OF CORRECTION

PATENT NO.   : 6,039,100
DATED        : Mar. 21, 2000
INVENTOR(S)  : Anton Müller It is certified that error appears in the above-identified patent and that said Letters Patent is hereby corrected as shown below:

On the title page, insert the following item:

[30] Foreign Application Priority Data

Jan. 11, 1997 [DE] Germany..........297 00 410.7

Signed and Sealed this

Sixth Day of March, 2001

Attest:

NICHOLAS P. GODICI

*Attesting Officer*      *Acting Director of the United States Patent and Trademark Office*